(12) United States Patent
Leung

(10) Patent No.: US 9,110,629 B2
(45) Date of Patent: Aug. 18, 2015

(54) ADAPTER DEVICE FOR TABLET COMPUTER

(76) Inventor: Elton Yu Man Leung, Kowloon (HK)

( * ) Notice: Subject to any disclaimer, the term of this patent is extended or adjusted under 35 U.S.C. 154(b) by 116 days.

(21) Appl. No.: 13/980,574

(22) PCT Filed: Jun. 27, 2012

(86) PCT No.: PCT/CN2012/077575
§ 371 (c)(1),
(2), (4) Date: Jul. 19, 2013

(87) PCT Pub. No.: WO2013/000403
PCT Pub. Date: Jan. 3, 2013

(65) Prior Publication Data
US 2013/0301200 A1    Nov. 14, 2013

(30) Foreign Application Priority Data
Jun. 29, 2011   (CN) .................... 2011 2 0224932 U

(51) Int. Cl.
*G06F 1/16* (2006.01)
*G06F 3/0354* (2013.01)

(52) U.S. Cl.
CPC ............ *G06F 1/1632* (2013.01); *G06F 1/1607* (2013.01); *G06F 1/1626* (2013.01); *G06F 3/03545* (2013.01)

(58) Field of Classification Search
CPC .............. G06F 1/16; G06F 1/632; H05K 5/00
USPC ....................................................... 361/679.4
See application file for complete search history.

(56) References Cited

U.S. PATENT DOCUMENTS

| | | | |
|---|---|---|---|
| 8,419,222 B2 * | 4/2013 | Hu et al. ..................... | 362/253 |
| 8,804,326 B2 * | 8/2014 | Ashida et al. .............. | 361/679.4 |
| 2010/0021022 A1* | 1/2010 | Pittel et al. ................. | 382/123 |
| 2010/0252337 A1* | 10/2010 | Yang ........................... | 178/19.01 |
| 2013/0335903 A1* | 12/2013 | Raken et al. ................ | 361/679.4 |
| 2014/0029182 A1* | 1/2014 | Ashcraft et al. ........... | 361/679.4 |
| 2014/0029183 A1* | 1/2014 | Ashcraft et al. ........... | 361/679.4 |

* cited by examiner

*Primary Examiner* — Forrest M Phillips
(74) *Attorney, Agent, or Firm* — Ladas & Parry, LLP

(57) ABSTRACT

This application relates an adapter device for tablet computer. This adapter device comprises a stylus and an adapter for fixing the stylus onto the tablet computer. The adapter is comprised of a buckling part and a plug-in part, wherein the buckling part is configured to fix the stylus and the plug-in part is plugged into an interface port of the tablet computer. The stylus can be attached onto the tablet computer by the adapter so as to bring convenience for user to achieve and improve accuracy of input. It also provides convenient means for stylus storage to prevent the stylus from loss.

12 Claims, 3 Drawing Sheets

ADAPTER DEVICE FOR TABLET COMPUTER

FIELD OF THE INVENTION

This application relates to peripheral fields of tablet computer and more specifically to an adapter device for tablet computer which is equipped with stylus.

BACKGROUND OF THE INVENTION

Touch control tablet computer is a computer device which receives input from finger tap or other touch gestures. Most of the tablet computers are not equipped with a stylus, but many daily activities such as signaturing, drawing and Chinese characters input could be more convenient and precise by utilizing a stylus when compare to finger input.

SUMMARY OF THE INVENTION

The objective of this application is to provide an adapter device for tablet computer which is equipped with stylus, aiming at the drawbacks that the above-mentioned tablet computer is inconvenient for input due to the lack of stylus.

In this application, the technical solution adopted to solve its technical problem is to construct an adapter device for tablet computer. This adapter device comprises a stylus and an adapter for fixing the stylus onto the tablet computer. The adapter is comprised of a buckling part and a plug-in part, wherein the buckling part is configured to fix the stylus and the plug-in part is plugged into an interface port of the tablet computer.

On the adapter device for tablet computer of this application, the buckling part has a groove which is throughout between both ends and adaptive with the stylus. The stylus is fixed within the groove through magnetic attraction.

On the adapter device for tablet computer of this application, the groove has an arc-shaped cross section. The outer surface of the stylus by which it is connected with the groove is an arc shape adaptive with the groove.

On the adapter device for tablet computer of this application, the buckling part is C-shaped.

On the adapter device for tablet computer of this application, the adapter is equipped with a bypass interface which is configured to be connected with a peripheral electrically.

On the adapter device for tablet computer of this application, an electrical structure of the bypass interface is the same as that of the interface port of tablet computer which the plug-in part is plugged into.

When implementing the adapter device for tablet computer of this application, the following advantageous effects may be achieved: stylus can be attached onto the tablet computer by the adapter so as to bring convenience for user to achieve and improve accuracy of input. It also provides a convenient means for stylus storage to prevent the stylus from loss.

BRIEF DESCRIPTION OF THE DRAWINGS

This application will be further illustrated with reference to accompanying drawings and embodiments. In the figures.

DETAILED DESCRIPTION OF THE PREFERRED EMBODIMENT

For the purpose of understanding the technical features, objectives and effects of this application more clearly, specific implementations of this application are illustrated in detail with reference to accompanying drawings.

Figure 1:
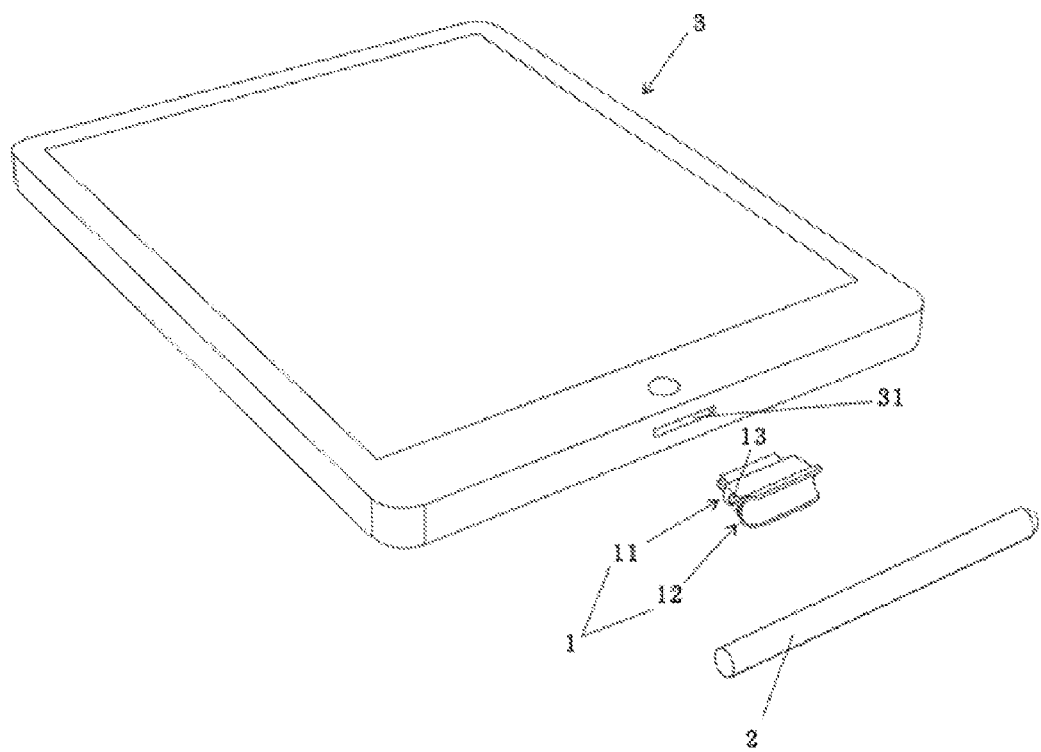
FIG. 1 is a first structural diagram illustrating the adapter device for tablet computer is connected with a tablet computer in a preferred embodiment of this application.
Figure 2:
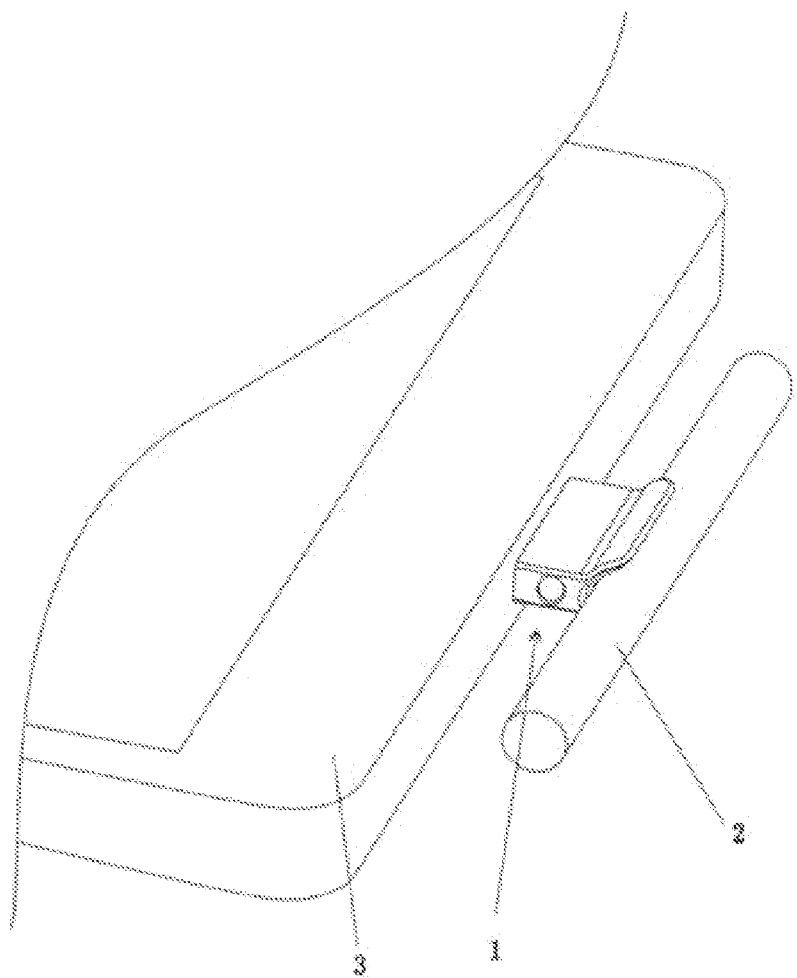
FIG. 2 is a second structural diagram illustrating the adapter device for tablet computer is connected with a tablet computer in a preferred embodiment of this application.

As shown in FIGS. 1 and 2, an adapter device for tablet computer in preferred embodiments of this application comprises a stylus 2 and an adapter 1 for fixing the stylus 2 onto a tablet computer 3. The adapter 1 is comprised of a buckling part 12 and a plug-in part 11. Herein, the buckling part 12 is configured to fix the stylus 2 and the plug-in part 11 is plugged into an interface port 31 of the tablet computer. The stylus 2 can be attached onto the tablet computer 3 by the adapter 1 so as to bring convenience for user to achieve and improve accuracy of input. It also provides a convenient means for stylus storage to prevent the stylus from loss.

At present, the interface ports 31 on portable electrical equipment such as charging interface, mini-USB interface, audio interface and interfaces on electrical products of Apple Inc. are of standardized design for maximum compatibility. In order to improve the compatibility of adapter 1, the shape and structure of the plug-in part 11 can be designed according to these standardized interface ports 31. The adapter 1 can thus be fixed onto the tablet computer 3 when the plug-in part 11 is plugged into the interface port 31 on the tablet computer 3.

Figure 3:
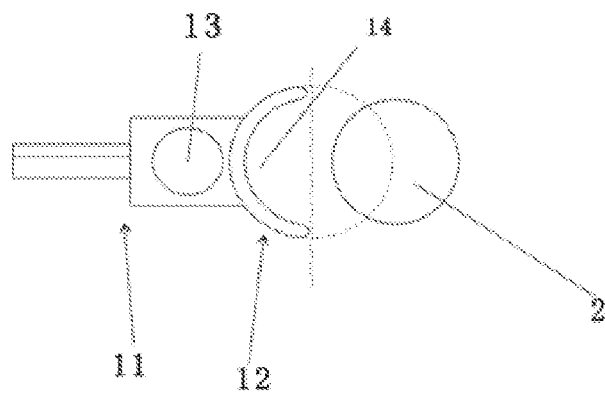
FIG. 3 is a structural diagram for the adapter device for tablet computer in a preferred embodiment of this application.

As shown in FIG. 3, the buckling part has a groove 14 which is throughout between both ends and adaptive with the stylus 2. The stylus 2 is fixed within the groove 14 through magnetic attraction. By the use of magnetic force, the stylus 2 can be achieved and stored easily. Specifically, a magnet can be installed on the buckling part 12 and the stylus 2 contains iron element. The stylus 2 can be attached to the arc-shaped surface by magnetic force so that the stylus 2 is fixed onto the adapter 1. It is also possible that the buckling part 12 contains iron element and the stylus 2 is equipped with a magnet.

As shown in FIG. 3, the groove 14 preferably has an arc-shaped cross section. The outer surface of the stylus 2 by which it is attached with the groove 14 is an arc shape adaptive with the groove. It should be understood that the shapes of groove 14 and stylus 2 are not limited as what is illustrated here. Instead, they can be square or any other shapes.

Figure 5:
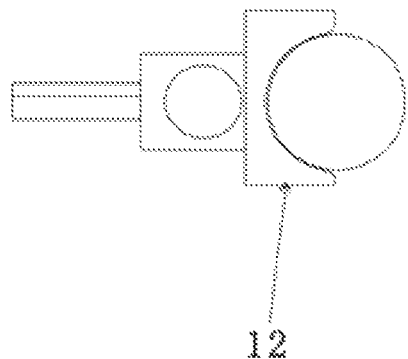

The buckling part 12 is C-shaped and the groove 14 is formed within this C-shaped structure to fix the stylus 2, by which the whole adapter is more aesthetic. As shown in FIG. 5, the buckling part 12 can be a square cylinder in another embodiment, in which case the groove 14 is located on further surface of the square cylinder away from the plug-in part 11.

Figure 4:
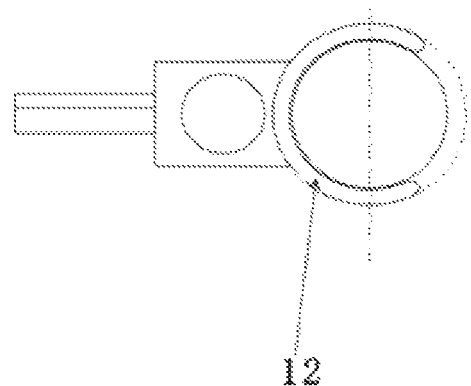
FIGS. 4-6 are structural diagrams for the adapter device for tablet computer in another three embodiments of this application.

When the cross section of groove 14 is or smaller than a semicircle, the stylus 2 and the adapter 1 are connected to each other by magnetic force. As shown in FIG. 4, the cross section of groove 14 can be larger than a semicircle in another embodiment. In this case, the stylus 2 and the adapter 1 are connected to each other by being buckled in the buckling part 12. The cross section of groove 14 can also be elliptically arc-shaped. Specifically, the sectional shape of groove 14 can be determined according to the shape of the stylus 2.

Figure 6:
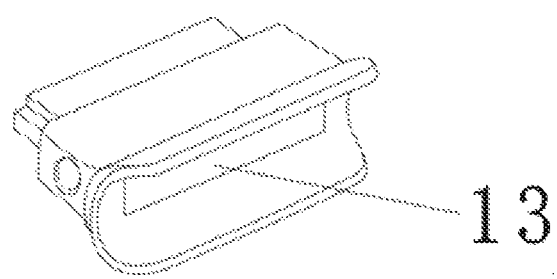

As shown in FIG. 3, the adapter 1 is equipped with a bypass interface 13 which is configured to be connected with a peripheral electrically. The plug-in part 11 is also electrically connected with the interface port 31. Any other peripherals such as data cable, charger and earphone can also be electrically connected with the tablet computer 3 through this bypass interface 13. That is, the adapter 1 functions as a connector. For example, the bypass interface 13 can be a USB port or a charging port, by which a connection is established with another computer or with a charger for charging through the use of a data cable. Preferably, the bypass interface 13 is located on a portion of the plug-in part 11 which is out of the interface port 31 of tablet computer 3. When the stylus 2 is fixed on the adapter 1, the tablet computer 3 can also be charged or connected with other peripherals simultaneously. As shown in FIG. 6, the bypass interface 13 can also be arranged on a bottom surface of the groove 14. It can be connected with any other peripherals once the stylus 2 is removed.

Preferably, the bypass interface 13 has the same electrical structure as in the interface port 31 of tablet computer 3 which the plug-in part 11 is plugged into. When the adapter device is plugged into the interface port 31 of tablet computer 3, it will not influence the function of this interface port 31. There is no need to remove the adapter 1 from the interface port 31 when the interface port 31 is needed, which reduces the risk of losing the adapter 1 and stylus 2.

Embodiments of this application are described with reference to accompanying drawings. However, this application will not be limited to the above-mentioned specific implementation. Instead, such specific implementations are for illustration rather than limitation. Under the inspiration of this application, the skill in the art can make many forms without departing from the subject of this application and scope of claims, wherein all these forms are within the protection of this application.

The invention claimed is:

1. An adapter device for use with a tablet computing device comprising a stylus and an adapter removably connectable with an electrical structure of the tablet computing device at an interface port of the tablet computing device, wherein said adapter includes a buckling part at which said stylus is removably stored, and a plug-in part protruding from said adapter and for mechanical anchorage to the interface port, wherein said plug-in part of said adapter is removably pluggable into the interface port.

2. The adapter device as claimed in claim 1, wherein said buckling part defines a groove extending across with opposite ends thereof and is adapted to accommodate said stylus, and wherein said stylus and said adapter are attracted together magnetically.

3. The adapter device as claimed in claim 2, wherein the groove has a cross section in an arc-shape for engagement with an outer surface of said stylus.

4. The adapter as claimed in claim 3, wherein the cross section of said buckling part generally assumes the shape of the letter "C".

5. The adapter device as claimed in claim 1, wherein said buckling part is provided with a bypass interface for electrical connection with a peripheral device.

6. The adapter device as claimed in claim 2, wherein said buckling part is provided with a bypass interface for electrical connection with a peripheral device.

7. The adapter device as claimed in claim 3, wherein said buckling part is provided with a bypass interface for electrical connection with a peripheral device.

8. The adapter device as claimed in claim 4, wherein said buckling part is provided with a bypass interface for electrical connection with a peripheral device.

9. The adapter device as claimed in claim 5, wherein said bypass interface includes an electrical structure being the same as the electrical structure of the tablet computing device.

10. The adapter device as claimed in claim 6, wherein said bypass interface includes an electrical structure being the same as the electrical structure of the tablet computing device.

11. The adapter device as claimed in claim 7, wherein said bypass interface includes an electrical structure being the same as the electrical structure of the tablet computing device.

12. The adapter device as claimed in claim 8, wherein said bypass interface includes an electrical structure being the same as the electrical structure of the tablet computing device.

* * * * *